(12) United States Patent
Smith

(10) Patent No.: US 8,534,746 B1
(45) Date of Patent: Sep. 17, 2013

(54) AERODYNAMIC NOSE CONE FRONT TRAILER

(76) Inventor: Edward John Smith, Brandon, FL (US)

( * ) Notice: Subject to any disclaimer, the term of this patent is extended or adjusted under 35 U.S.C. 154(b) by 0 days.

(21) Appl. No.: 13/385,313

(22) Filed: Feb. 13, 2012

Related U.S. Application Data

(63) Continuation-in-part of application No. 12/798,557, filed on Apr. 7, 2010, now Pat. No. 8,113,570.

(51) Int. Cl.
*B60P 3/06* (2006.01)
*B60P 3/355* (2006.01)

(52) U.S. Cl.
USPC ............ 296/180.4; 296/185.1; 296/186.4; 296/169; 296/173; 296/26.02; 296/26.12; 296/26.15

(58) Field of Classification Search
USPC ............ 296/180.1, 180.4, 181.5, 186.4, 169, 296/296/173, 26.02, 26.12, 26.15, 185.1, 296/186.1, 168, 174, 26.01
See application file for complete search history.

(56) References Cited

U.S. PATENT DOCUMENTS

| | | | | |
|---|---|---|---|---|
| 3,866,968 A | * | 2/1975 | Donahue | 296/180.4 |
| 4,302,044 A | * | 11/1981 | Sims | 296/186.4 |
| 5,487,586 A | * | 1/1996 | Kinkaide | 296/180.1 |
| 6,817,653 B2 | * | 11/2004 | Ropp | 296/186.2 |
| D626,891 S | | 11/2010 | Smith | |

* cited by examiner

*Primary Examiner* — Glenn Dayoan
*Assistant Examiner* — Gregory Blankenship

(57) ABSTRACT

An aerodynamic nose cone front trailer that uses a topographical view for reference extending the trailer front all the way to the hitch. The trailer design reduces wind resistance while improving the fuel economy and improving the handling.

8 Claims, 7 Drawing Sheets

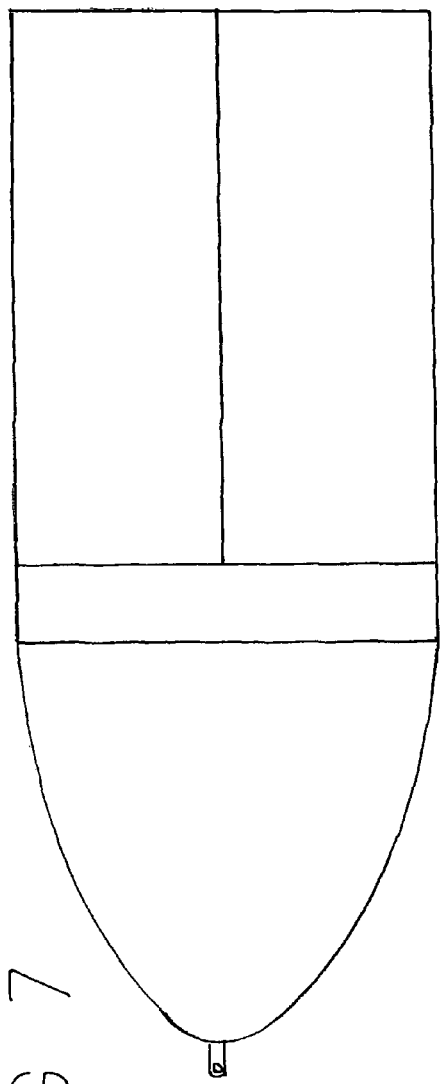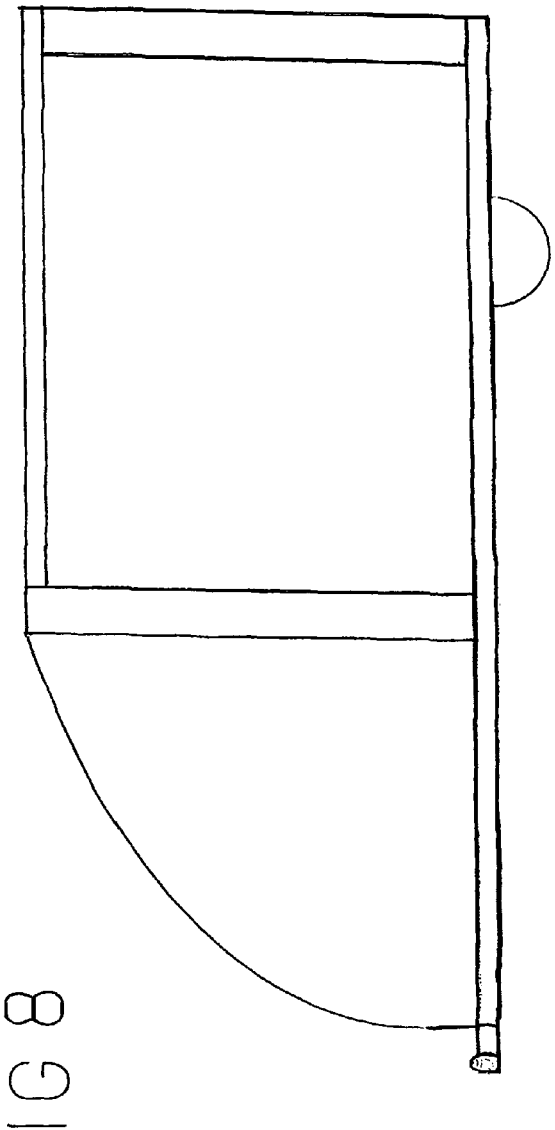
FIG 7
FIG 8

AERODYNAMIC NOSE CONE FRONT TRAILER

RELATED APPLICATION

The present application is a continuation in part of U.S. patent application Ser. No. 12/798,557 filed Apr. 7, 2010 and issued Feb. 14, 2012 as U.S. Pat. No. 8,113,570 the subject matter of which is incorporated herein by reference.

BACKGROUND OF THE INVENTION

1. Field of the Invention

The present new invention relates to a trailer and more particularly pertains to an aerodynamic nose cone front trailer that extends all the way to the trailer hitch, while using a topographical point of view for reference, and having a tongue part of the trailer frame. The nose cone trailer front design that can be made in two different styles: without doors and with walk in entry doors to the trailers interior space. There are a variety of doors located in the main body of the trailer.

2. Description of the Prior Art

There are many different trailer designs that have been invented and recorded over the years. More specifically trailer designs heretofore devised and utilized are known to consist basically of familiar expected and obvious structural configurations notwithstanding the myriad of designs encompassed by the crowded prior art which have been developed for the fulfillment of countless objectives and requirements.

Some known prior art in this area includes U.S. Pat. No. 1,422,498 which is one of the original and oldest camping trailers on the record and built with a design of a square front just like the trailers of today. Trailers that are designed in this matter are inferior because they are not economical to tow and they are harder to handle for the driver.

This disadvantage of more wind resistance gives less NASCAR draft efficiency as well as less fuel efficiency. The inferior shape design gives a smaller interior space not large enough for bigger items to transport or utility, workshop, office or hygiene usages.

SUMMARY OF INVENTION

This is an aerodynamic nose cone front trailer, while using a topographical point of view for reference, that extends to the hitch of the trailer and covering the tongue part of the trailers frame including any additional modifications to it. An aerodynamic nose cone front trailer design that reduces wind resistance while improving the fuel economy and improving the trailer handling. The unitized aerodynamic nose cone front trailers design shape is made in two different styles: one with no doors and the other style with at least one walk in door. The unitized aerodynamic nose cone front trailer is composed of two interior zones: the aerodynamic nose cone front and the trailers main body or rear. Included in the main body of the trailer is at least one wide door and at least one walk in door. The roof is composed of at least one door for easier entry to transport and for viewing the exterior surroundings. There is at least one movable locking roof support brace installed in the trailers main body for stability purposes. All the doors in the trailer have locks or are lockable for security purposes. Windows are installed in the trailers main body section. Interior trailer space can be used for but not limited to transporting, camping, storage, office, workshop, utility, and hygiene purposes. The exterior is made from a class of rigid materials preferably metal, fiberglass, ABS, or any other suitable material in the rigid group class.

ADVANTAGES

Accordingly several advantages of one or more aspects are as follows: to provide a aerodynamic nose cone front trailer that is economical to purchase, that has low maintenance, that has an aerodynamic design, that the design has graceful functional lines, that the design of the trailer yields better fuel economy and better handling for the driver, that the trailer is light in weight, that the trailer is strong, that the trailer is durable, that the trailer is built with quality material, that the trailer has at least one walk in door in the aerodynamic nose cone trailer front, that the trailer also can be built with no doors in the aerodynamic nose cone trailer front, that the trailer creates extra space, that the trailer has sound deadening properties over the flat front trailer, that the trailer has locks on the doors for security of items, that the trailer has a smooth aerodynamic surface over a flat front trailer, that the trailer has a high strength to thickness ratio, that the trailer has a high strength to weight ratio, that the trailer facilitates paint or the use of color in the mold, that the trailers main body has at least one door in the roof, that the trailer has at least one walk in door in the trailers main body, that the trailer has at least one wide door in the trailers main body, that the trailer extends to the hitch and having a tongue part of the frame, that the trailer has at least one moveable locking roof support brace in the trailers main body for stability and strength, that the trailer has at least two wheels, that the trailer, that the trailers interior space can be used for transporting, camping, storage, office, workshop, hygiene purposes, and that the trailer is made from a group of rigid materials.

These and other advantages of one or more aspects will be apparent from the consideration of the drawings and ensuing description.

BRIEF DESCRIPTION OF THE DRAWINGS

FIG. 7. is a topographical view of the second designed embodiment aerodynamic trailer showing the roof doors in a closed positions and its related position to the trailer hitch.

FIG. 8. is a left side view of the second designed aerodynamic trailer showing the wide doors in a closed position with the right side being a mirror of the same.

LIST OF DRAWINGS REFERENCE NUMBERS

Figure 1:
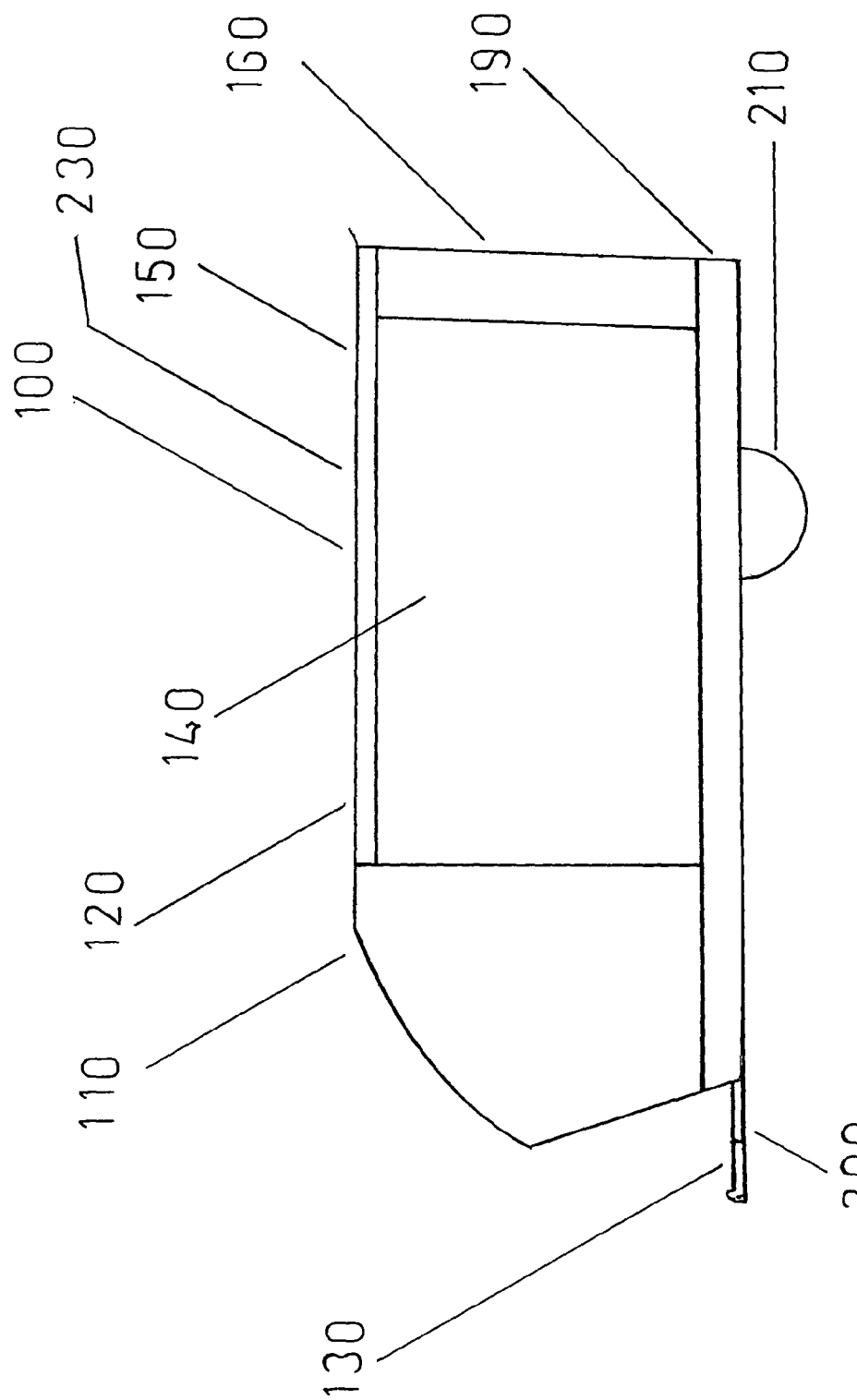
FIG. 1. is a left side view of the aerodynamic trailer without doors of the preferred embodiment and the right side being a mirror of the same.

100—Aerodynamic nose cone front trailer
110—Aerodynamic nose cone trailer front

120—Trailer main body
130—Hitch
140—Wide door
150—Roof door
160—Rear door ramp
170—Walk in door
180—Lock
190—Trailer frame
200—Trailer frame tongue
210—Wheel
220—Trailer interior space
230—Aerodynamic design of a wind resistant trailer
240—Window
250—Movable locking roof support brace
260—Ground support stabilizers

DETAILED DESCRIPTION

In reference to the purposes of the description herein, the terms "left", "right", "frame", "tongue", and derivatives thereof, shall relate to the invention as it is oriented in the drawing figures. However, it is to be understood that the invention may assume various alternatives variations, except where expressly specified to the contrary. It is also to be understood that the specific devices illustrated in the attached drawings, and described in the following specifications, are simply exemplary embodiments of the invention. Hence, specific dimensions and other physical characteristics related to the embodiments disclosed herein are not to be considered limiting in the invention.

An aerodynamic nose cone front trailer 100 while using a topographical point of view for reference, that extends to the hitch of the trailer 130 and covering the tongue part of the trailers frame 200 including any modifications to it. This is a aerodynamic nose cone front trailer design of wind resistance 230 while improving the fuel economy and improving the trailer handling. The unitized aerodynamic nose cone front trailer 100 design shapes are made in two different styles: one without doors and the other style with at least one walk in door 170.

While looking at FIG. 1, it shows the preferred embodiment of the invention an aerodynamic nose cone front trailer 100, along with the aerodynamic nose cone trailer front 110 and the trailers main body 120. The trailers interior space is composed of two interior zones: the aerodynamic nose cone front 110 and the trailer main body 120 or rear. Included in the main body of the trailer 120 is a least one wide door 140 and at least one walk in door. The roof is composed of at least one roof door 150 for ease of entry to transport and for the viewing of the exterior surroundings. There is at least one movable locking roof support brace 250 installed in the trailers main body 120 in order to give the trailer more stability. All the doors in the trailer have at least one security lock 180 installed in them. Windows 240 are installed in the main body of the trailer 120. Interior trailer space 220 can be used for but not limited to transporting, camping, storage, office, workshop, utility, and hygiene purposes. The exterior of the trailer is made from a class of rigid materials preferably metal, fiberglass, ABS, or any other suitable material in the rigid group class. There are at least two wheels 210 on the trailer. Ground support stabilizers 260 are added to the trailer frame 190 and the wide doors 140 while parked. There is at least one wide door 140 which can be used for many purposes but mainly camping, entry and exit. A rear door ramp 160 is added and is helpful for easy entry, exit and the transporting of items.

Figure 2:
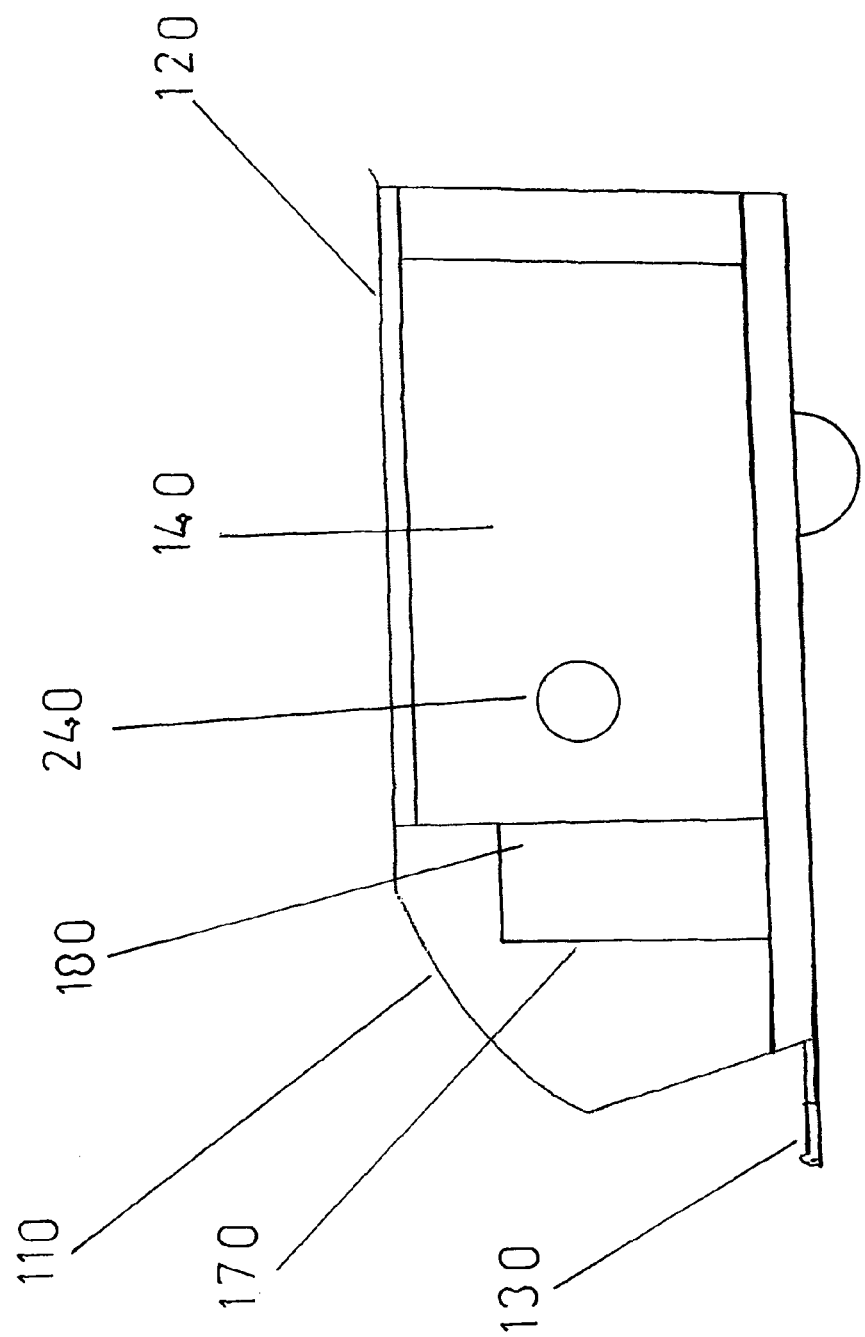
FIG. 2 is a left side view of the aerodynamic trailer with closed doors of the preferred embodiment and the right side being a mirror of the same.
Figure 3:
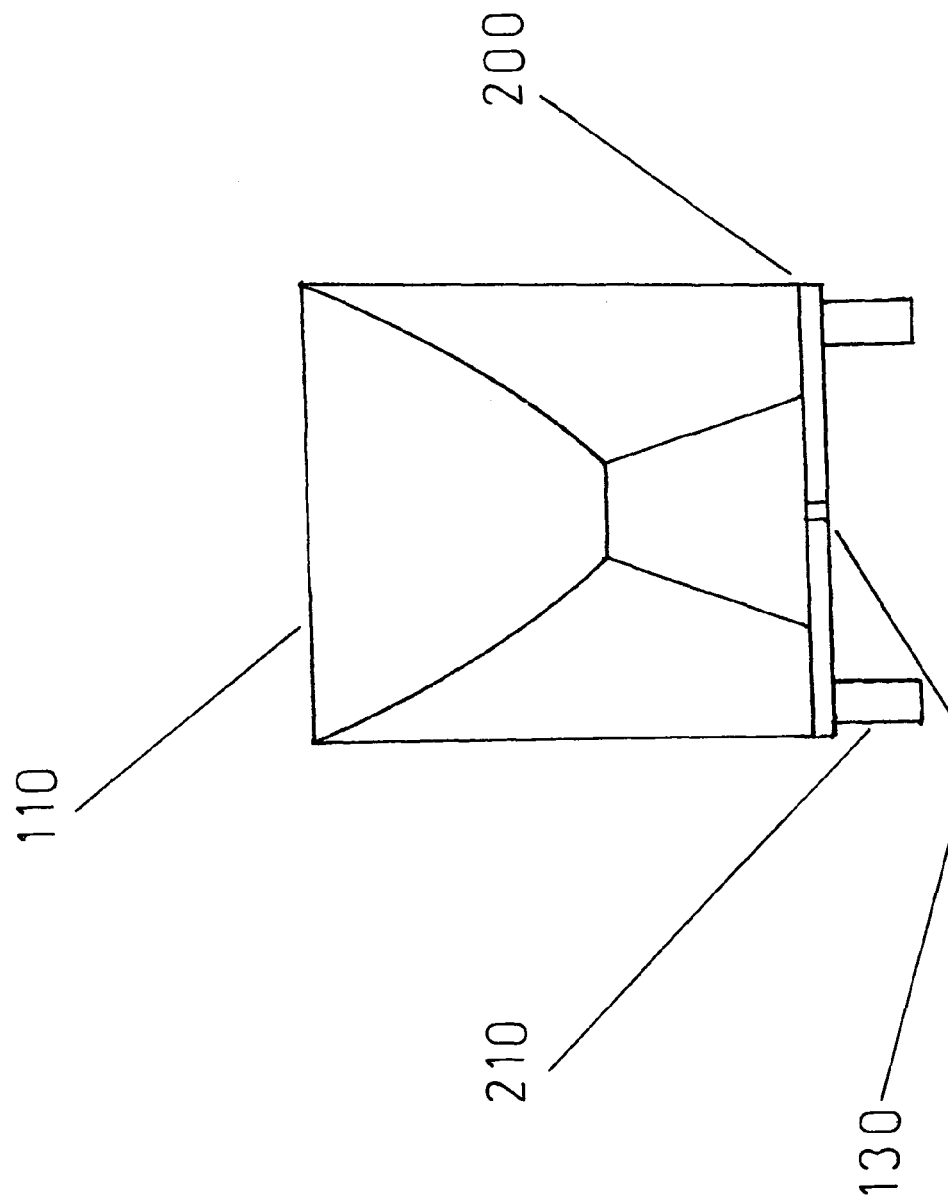
FIG. 3. is a front view of the aerodynamic trailer of the preferred embodiment.
Figure 4:
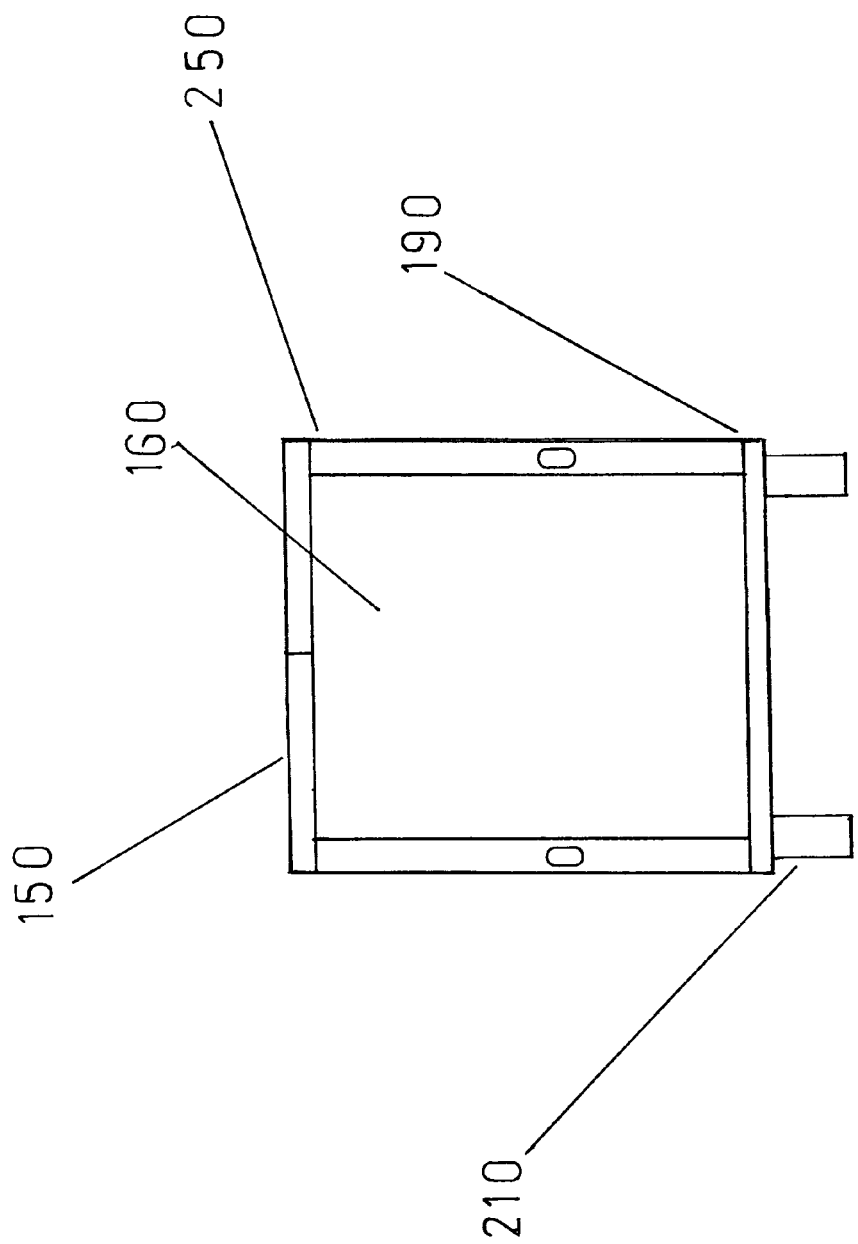
FIG. 4. is a rear view of the aerodynamic trailer of the preferred embodiment showing all of the doors in a closed position.
Figure 5:
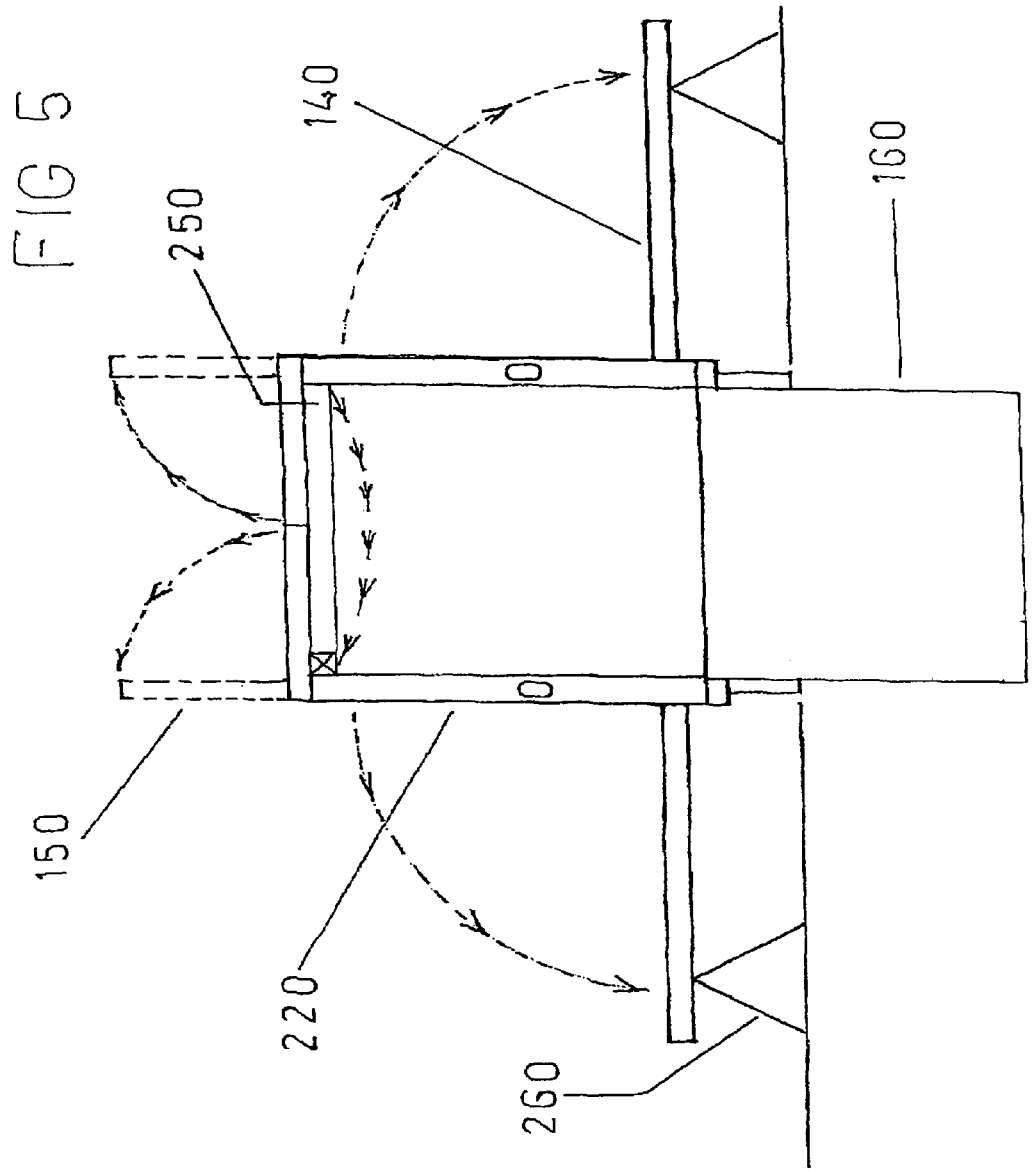
FIG. 5. is a rear view of the aerodynamic trailer of the preferred embodiment with motion direction indicators showing both the wide supported doors and the roof doors in a open position and the rear door ramp in a closed position.
Figure 6:
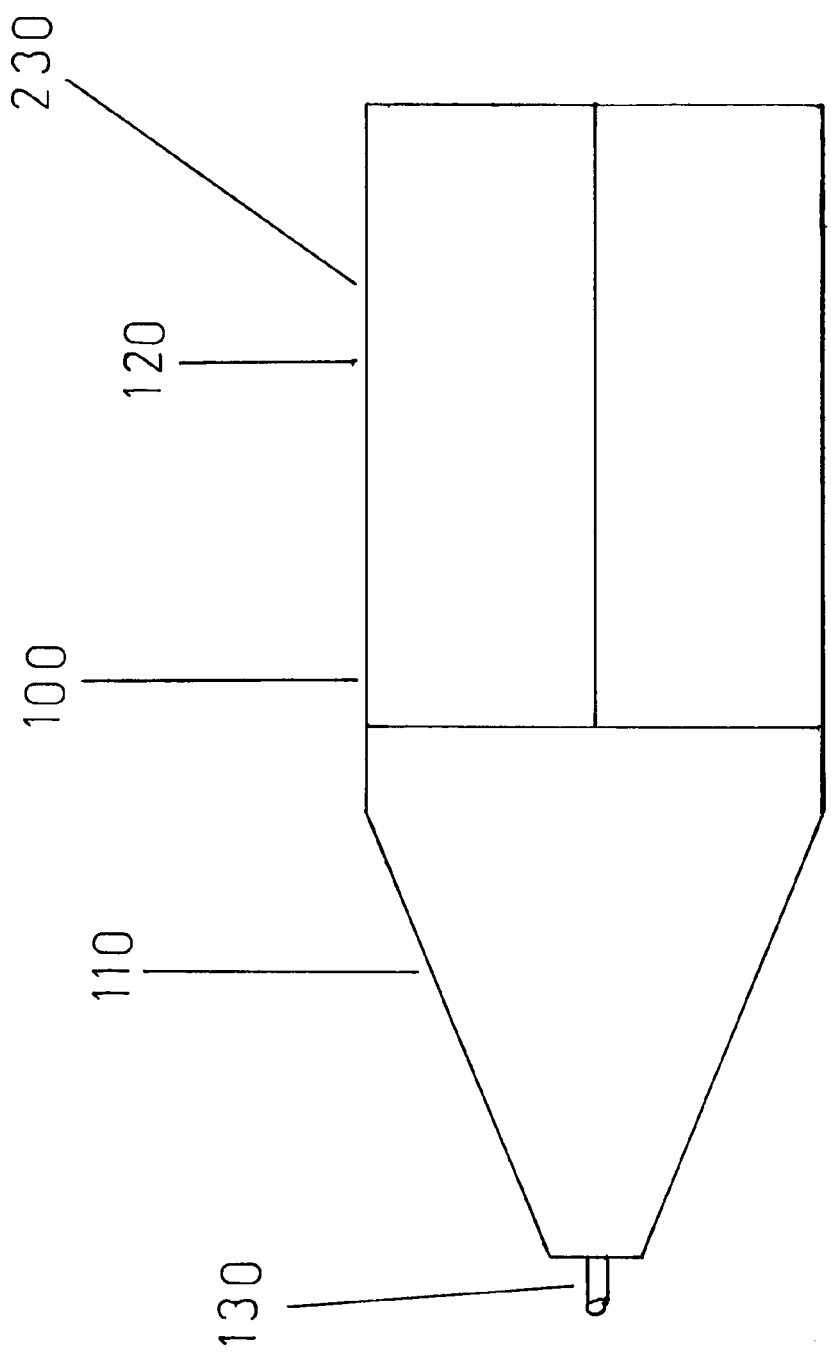
FIG. 6. is a topographical view of the aerodynamic trailer of the preferred embodiment showing its related position to the trailer hitch.

In FIG. 2. one can view the walk in door 170 which is one of the two styles that the aerodynamic nose cone trailer front 110 is made in. Security is given a top priory, with all the doors 170 and windows 240 having at least one lock 180. The combination of the aerodynamic nose cone trailer front 110 and the trailer main body 120 yields a aerodynamic design of a wind resistant trailer called the "Aerodynamic nose cone front trailer." The wide doors are built in such a matter that they take up the majority of the side area. FIG. 3. is a front view of the aerodynamic nose cone trailer front 110 in the preferred embodiment model and the trailer frame tongue 200 with the hitch 130. FIG. 4. is a rear view of the preferred embodiment model that is composed mainly of the rear door ramp 160 in a closed position. Also one can see the roof doors in a closed position. The moving locking roof support brace 250 stabilizes and strengthens the composition of the trailers solid construction. FIG. 5. is a rear view of the preferred embodiment showing some of the versatility of the trailers components. Both the roof doors 150 and the wide doors 140 are in the open positions for maximum ventilation. The ground support stabilizers 260 give stability to the firmness of position. The trailers interior space 220 can be used for but not limited to camping, transporting, storage, workshop, hygiene, office and utility purposes. The exterior is made from a class of rigid materials preferably metal, fiberglass ABS or any other suitable material in the rigid class group. The unitized aerodynamic nose cone front trailer 100 is composed of two interior zones: aerodynamic nose cone trailer front 110 and the trailer main body 120. FIG. 6. is a topographical view of the aerodynamic nose cone front trailer 100 and its related position to the trailer hitch 130 both yielding an aerodynamic design of a wind resistant trailer 230. FIG. 7. is a topographical view of the second embodiment with the roof doors 150 in a closed position. FIG. 8. is a left side view of the second embodiment with the wide door in a closed position.

Thus there has been provided a aerodynamic nose cone front trailer that fully satisfies the objects and advantages set forth herein. While the invention has been described in conjunction with the preferred embodiment, it is evident that many embodiments other than the two shown have alternatives, modifications and variations will be apparent to those skilled in the art in light of the foregoing description such as using different designs and different materials. Accordingly, it is intended to embrace all such alternatives, modifications and variations.

What is claimed is:

1. An aerodynamic trailer that has a hitch, a trailer frame, a trailer body, and at least two wheels, the hitch has a tongue part of the trailer frame, the trailer body extends to the hitch, the trailer comprising:

a unitized aerodynamic nose cone from trailer design that reduces wind resistance while improving the fuel economy and improving the handling;

the trailer body comprising a one-piece integral shell with an aerodynamic nose cone and a trailer main body;

the trailer main body side has at least one wide door that extends substantially the majority of the area of the trailer main body, the at least one door pivots from a vertical position to a horizontal position that can support people for sleeping and camping;

the trailer main body has a rear door ramp used for easy walk in entry and transporting;

the trailer main body has a rear with at least one door having a closed position that closes a rear opening in the trailer body and an open position allowing access to the interior of the trailer;

the trailer main body has a roof with at least one roof door and at least one moveable locking roof support brace, the at least one roof door and the at least one moveable locking roof support brace can pivot from a horizontal, closed position to an open position, the at least one moveable locking roof support brace provides strength and rigidity to the trailer body when in the horizontal position;

when the at least one rear door, the at least one roof door, and the at least one moveable locking roof support brace are in the open positions, a height of the rear opening is not restricted; and an exterior made from a group of rigid materials comprising one of metal, fiberglass, and ABS.

2. An aerodynamic trailer of claim 1, the nose cone has no doors.

3. An aerodynamic trailer of claim 1, the nose cone has at least one walk in door.

4. An aerodynamic trailer of claim 1, the nose cone provides an interior space for storage, hygiene and utilities.

5. An aerodynamic trailer of claim 1, the trailer main body has a interior space for transporting, camping, and storage.

6. An aerodynamic trailer of claim 1, wherein there is at least one window in the trailer main body.

7. An aerodynamic trailer of claim 1, wherein at least one door has a lock.

8. A unitized aerodynamic nose cone front trailer that has a hitch, a trailer frame, a trailer body, and at least two wheels, the hitch has a tongue part of the trailer frame, the trailer body extends to the hitch, the trailer comprising:

a aerodynamic nose cone front trailer design that reduces wind resistance while improving the fuel economy and improving the handling;

the trailer body comprising a one piece, integral shell with an aerodynamic nose cone and a trailer main body;

the trailer main body side has at least one door that extends substantially the majority of the area of the trailer main body, the at least one door pivots from a vertical position to a horizontal position that can support people for sleeping and camping;

the trailer main body has a rear door ramp used for easy walk in entry and transporting;

the trailer main body has a rear with at least one door having a closed position that closes a rear opening in the trailer body and an open position allowing access to the interior of the trailer;

the trailer body has a roof with at least one roof door and at least one moveable locking roof support brace, the at least one roof door and the at least one moveable locking roof support brace can pivot from a horizontal, closed position to an open position, the at least one moveable locking roof support brace provides strength and rigidity to the trailer body;

when the at least one rear door and the at least one roof door and the at least one moveable locking roof support brace are in the open position, the height of the rear opening is not restricted; and an exterior made from a group of rigid materials comprising one of metal, fiberglass, and ABS.

\* \* \* \* \*